United States Patent [19]

Iwai et al.

[11] Patent Number: 4,869,961

[45] Date of Patent: Sep. 26, 1989

[54] COATING OF GRANULAR AROMATIC DIAMINE

[75] Inventors: Kazuo Iwai, Fujinomiya; Teiichi Kanazawa, Shinagawa; Yoshijiro Oyaizu, Fujikawacho, all of Japan

[73] Assignee: Ihara Chemical Ind. Co., Ltd., Tokyo, Japan

[21] Appl. No.: 134,853

[22] Filed: Dec. 18, 1987

Related U.S. Application Data

[63] Continuation of Ser. No. 879,816, Jun. 27, 1986, abandoned.

[30] Foreign Application Priority Data

Jun. 29, 1985 [JP] Japan .................. 60-141513

[51] Int. Cl.$^4$ .................. B32B 5/16; B05D 7/00
[52] U.S. Cl. .................. 428/407; 428/413; 428/423.1; 428/480; 428/521; 428/522; 428/543; 428/473.5; 428/474.4; 427/212; 427/214; 252/182.15; 252/182.18; 252/182.22; 252/182.24; 252/182.26
[58] Field of Search .................. 428/407, 403, 423.1, 428/413, 480, 524, 522; 427/212, 214

[56] References Cited

U.S. PATENT DOCUMENTS 4,009,076 2/1977 Green et al.
4,425,170 1/1984 Jones.
4,531,953 7/1985 Groose et al.

Primary Examiner—P. C. Ives

[57] ABSTRACT

By coating the surface of granular harmful aromatic diamine with an organic coating agent consisting of aromatic diamine having no variant-causing property, at least one member selected from glycols and a syntehtic resin having solubility parameter of 9.0 or higher, the aromatic diamine which is regarded as harmful can be handled safely without damaging its essential property as a hardening agent.

8 Claims, No Drawings

COATING OF GRANULAR AROMATIC DIAMINE

This is a continuation of Application Ser. No. 879,816, filed June 27, 1986, now abandoned.

BRIEF SUMMARY OF THE INVENTION

This invention relates to aromatic diamine which is used as a hardening agent for polyurethane, epoxy resin, polyamide resin, polyimide resin, etc.

Aromatic diamines such as 4,4'-methylene-bis (2-chloroaniline), 4,4'-diaminodiphenylmethane, 4,4'-diaminodiphenyl ether, P-phenylenediamine and m-phenylenediamine have conventionally and extensively been employed as a superior hardening agent for various types of polymers including polyurethane, epoxy resin, polyamide resin, polyimide resin and halogen-containing hydrocarbon polymer, and the polymers made by using such aromatic diamines exhibit extremely good physical properties (mechanical and dynamic properties).

Many of the aromatic diamines, however, have harmful properties so as to cause irritation and inflammation through contacts, to the skin, eyes, and respiratory system, adverse effects on the urinary passage through absorption via the respiratory and digestive systems, and even toxicity such as carcinogenicity, which require precaution which using such diamines.

As such toxic aromatic diamines, for instance, there is 4,4'-methylene bis-(2chloroaniline) the use of is restricted under labor, safety and hygienic laws. As the compounds which, although not under legal restrictions, do pose toxic problems, there are, among others, 4,4'-diaminodiphenylmethane, as hardening agent for epoxy resin, and 4,4'-diaminodiphenyl ether, P-phenylenediamine, m-phenylenediamine, etc. as hardening agent for polyamide resin, and there are, also, 4,4'-diaminodiphenyl sulfide, 4,4'-methylene bis (2-methylaniline), 4,4'-methylene bis (2-ethylaniline), diaminopseudocumene, diaminomesitylene, etc.

In view of their great importance as hardening agents for polyurethane, epoxy, polyamide, polyimide and other resins, if their use should be banned simply becuase of their toxicity, it would be unavoidable for the industries of various polymers to undergo serious retrogression. Therefore, those toxic aromatic diamines which are solid are being handled in such a way that their direct contact to human bodies is prevented by use of protective gloves and dust-proof masks. Furthermore they are handled in the form of flakes or grains during use and transportation so as to prevent them from flying around in air, thus minimizing its contact to human bodies.

The conventional technology, however, is still far from being adequate for attaining the above-mentioned desired effects in handling and transit as well.

The purpose of this invention, accordingly, is to provide aromatic diamine in a safe form that would not fly around during use and transportation so as to eliminate its contact with human bodies, without damaging the fundamental performance of the toxic aromatic diamine as hardening agent, etc. and without extending adverse effects on the physical properties of polymers including polyurethane and epoxy that may be obtained by using it as a hardening agent.

The feature of this invention lies in coating the surface of the granular toxic aromatic diamine with an organic coating agent consisting of at least one aromatic diamine and a non-toxic glycol as well as a synthetic resin possessing a value of parameter 9.0 or more.

DETAILED DESCRIPTION

The aromatic diamine of this invention is manufactured by coating toxic aromatic diamines such as 4,4'-methylene bis (2-chloroaniline), 4,4'-diaminodiphenyl methane, 4,4'-diaminodiphenyl ether, P-phenylenediamine, m-phenylene diamine, 4,4'-methylene bis (2-methylaniline), 4,4'-methylene bis (2-ethyl aniline), diaminopseudocumene, and diaminomesitylene (hereinafter called "the base ingredients") with an organic coating agent consisting at least of an aromatic diamine and a glycol selected from those that have been verified to be safe with no carcinogenicity through a test for harmful properties which is widely known as a short-term screening test for carciogenic substances, as well as with a synethetic resin having a solubility parameter of 9.0 or more.

The organic coating agent used in coating the basic ingredients are required to have four characteristics which are: (1) the organic coating agent itself must be safe and free from harmful properties; (2) it must not adversely affect the performance of the basic ingredients and the physical properties of the polymers including polyurethane and epoxy which are obtained by using the aromatic diamine of the invention as a hardening agent; (3) since it is heated and melted in being used as the hardening agent for the aromatic diamine of this invention, it must be solid at room temperature, totally molten under heat, and will completely melt with the basic ingredients; and (4) since it needs to be dissolved in an organic solvent for the coating purpose, it must completely dissolve in the organic solvent.

As the aromatic diamines whose safety can be verified to be used as the organic coating agent in this invention, i.e., aromatic diamines free from variant-causing properties, it is possible to cite diaminodiphenyl sulfone, 1,3-propanediol bis (4-aminobenzoate), 1,2-bis (2-aminophenyl thio) ethane, 4,4'-methylene bis (methyl anthranilate), 4-chloro-3,5-diamino benzoic acid isobutyl, 4,4'-methylene bis (2,6-dimethyl aniline), 4,4'-methylen bis (2,6-diethyl aniline), 4,4'-methylene bis (2-methyl-6-isopropyl aniline), 4,4'-methylene bis (2,6-di-isopropyl aniline), 4,4'-methylene bis (2,3-dichloroaniline), 4,4'-methylene bis (2,5-dichloro aniline), 4,4'-methylene bis (2-methyl-6-chloro aniline), 4,4'-methylene bis (2-ethyl-6-chloro cniline), 2,3,5,6-tetramethyl-1,4-phenylene diamine, and the like.

Further, as glycols, hydroquinone-bis (2-hydroxy ethyl) ether, N,N-dihydroxy ethyl aniline, and the like may be cited. As synthetic resins having a solubility parameter of 9.0 or more, it is possible to enumerate urethane, epoxy, polyester, chloroprene, chlorinated rubber, vinyl chloride, nitrile rubber, cyanoacrylate, urea, polyvinyl alcohol, etc., and as mixtures thereof, phenolic epoxy, epoxy polysulfide, polyoxy polyamide, urethane epoxy, urethane-chlorinated rubber, urethane-vinyl chloride, nitrile rubber-phenolic and vinyl-phenolic. In particular, it is desirable that the resins being easily miscible with polymers such as polyurethane and epoxy that can be synthesized from coating aromatic diamine, including urethane type, epoxy type, phenol type, and vinyl chloride type, and mixtures thereof be utilized.

Synthetic resins having a solubility parameter of 9.0 or less, such as polyethylene and polybutadiene are not usable for since they are insoluble.

This invention features the use of an organic coating agent consisting of the aforementioned safety-verified aromatic diamine, at least one glycol, and a synthetic resin having a solubility parameter of 9.0 or more. Therefore in case an organic coating agent consisting of a single one of the safety-verified aromatic diamine, at least a glycol or a synethic resin with value of 9.0 or more in solubility parameter is used, the purpose of this invention will not be attained because a useful coating cannot be obtained.

The surface coated granular aromatic diamine of this invention is manufactured firstly by preparing a solution of the organic coating agent by thoroughly dissolving the organic coating agent in an organic solvent such as ethanol, isopropyl alcohol, ethylene dichloride, dichloromethane, tetrahydrofuran, 2-methoxy ethanol, 2-ethoxy ethanol, acetone, ethyl acetate, methylethyl ketone, toluene, xylene, etc. and secondly by coating granular basic ingredients with the solution thus prepared by dipping or spray coating. While the concentration of solids of the organic coating agent in the solution of the organic coating agent (hereinafter called the solid concentration) may be selected arbitrarily, with increases in the concentration, the viscosity will sharply rise, thus greatly lowering the workability of the coating. It is, therefore, desirable that the viscosity be 500 cp or less, and preferably 100 cp. Further, although the volume of coating material in the organic coating agent is freely changeable, the performance of the basic ingredients can be decreased if the coating material is in excess of 25% of the basic ingredients. It is therefore desirable that it be 25% or less, and preferably 10% or less.

From the standpoint of economics with relation to the volume of coating material, coating time, etc., it is desirable that it be prepared as thin as possible and that it is applied in a short period of time.

Another major feature of this invention is its superior function whereby the thermal stability while the basic ingredients are molten can be greatly improved when epoxy resin is employed as the organic coating agent.

This invention with the foregoing contents has made it possible to handle the basic ingredients under safe conditions, and the mechanical properties of the polymer that has been synthesized by use of the coated basic ingredients, namely, the surface-coated granular aromatic diamine of this invention have exhibited the properties totally equivalent to those of the basic ingredients alone, thus causing no effects to the mechanical properties of the polymer.

The following examples further illustrated this invention.

For performing the coating process of this invention, a spray type flow coater model GPA (made by Frointo Sangyo Co., Ltd.) was used.

For checking the coated conditions of the coated basic ingredients or the surface coated granular aromatic diamine, gold was vapor-deposited on a cross section of the surface coated granular aromatic diamine, which was analyzed under a scanning electron microscope model JSM-T-300 (made by Nippon Bunko Co., Ltd.)

The mechanical properties of the polymer synthesized using the surface coated granular aromatic diamine of this invention was examined pursuant to JIS K-6301 in the case of urethane resin, and pursuant to JIS K-6911, 7113 in the case of epoxy resin.

A. Preparation of organic coating agent solution

Example for reference 1. Preparation of urethane resin solution (I)

150 gr of polytetramethylene ether glycol (OH value 103, average molecular weight 1,089) was added to 40.5 gr of 2,4-tolylene diisocyanate, and the mixture was allowed to undergo reaction at 80° C. for 8 hours. The content of isocyanate of the obtained prepolymer was 4.2 weight% and the average molecular weight 2,000. Then, 1,500 gr of fully dehydrated ethylene dichloride was added thereto to obtain a prepolymer solution (a). Next, 59.9 gr of 1,3-propanediol bis (4-aminobenzoate) was added to 1,500 gr of ethylene dichloride which was fully dehydrated separately, and this was followed by heating up to 60° to 65° C. while stirring the mixture carefully for its total dissolution. While keeping this temperature, 1,690 gr of the prepolymer solution (a) synthesized previously was titrated over a period of about 30 minutes, and after another 2 hours at the same temperature for reaction and aging, urethane resin solution (I) was obtained. This solution was analyzed by infrared absorption spectrum to find no absorption of free isocyanate.

Example for reference 2. Preparation of polyurethane resin solution (II)

45.9 gr of isomeric compound of 80:20 (TDI-80) of 2,4 and 2,6-tolylene diisocyanate was added to 154.7 gr of polypropylene ether glycol (OH value, 100) and this was followed by reaction at 80° C. for 2 hours. The content of isocyanate group of the obtained prepolymer was 4.7 weight% and the average molecular weight was 1,788.

1,500 gr of fully dehydrated ethylene dichloride was added thereto to make it prepolymer (b).

Next, 49.4 gr of hydroquinone bis (2-hydroxy ethyl) ether was added to 1,500 gr of ethylene dichloride which was fully dehydrated separately, and the solution is heated up to 60° to 65° with thorough stirring. Satisfactory dissolution was attained. By leaving the temperature at the above level, 1,700.6 gr of the prepolymer solution (b) which was synthesized previously was titrated over a period of about 30 minutes, and this was followed by 2 hours of reaction and aging at the same temperature to obtain polyurethane resin solution (II).

Analyzing this solution by infrared absorption spectrum, no absorption of free isocyanate was seen.

EXAMPLE 1

Preparation of organic coating agent solution (I)

5,300 gr of ethanol and 212 gr of 1,3-propanediol bis (4-aminobenzoate) were added to 404 gr of polyurethane resin solution (I), well stirred and dissolved to obtain an organic coating agent solution (I).

EXAMPLE 2

Preparation of organic coating agent solution (II)

5,300 gr of ethylene dichloride and 212 gr of hydroquinone-bis (2-hydroxy ethyl) ether were added to 494 gr of urethane resin solution (II), stirred well and dissolved to obtain an organic coating agent solution (II).

EXAMPLE 3

Preparation of an organic coating agent solution (III)

38 gr of epoxy resin (tradename: Epikote 1004, made by Yuka Shell Epoxy Co., Ltd.), 212 gr of 4,4-diaminodiphenyl sulfone, and 3,000 gr of ethanol were added to 3,000 gr of ethylene dichloride, evenly dissolved and an organic coating agent solution (III) was obtained.

EXAMPLE 4

Preparation of an organic coating agent solution (IV)

38 gr of epoxy resin (tradename: Epikote 1004, made by Yuka Shell Epoxy Co., Ltd.) was added to 3,000 gr of ethylene dichloride, fully dissolved, and then 3,000 gr of ethanol and 212 gr of 1,3-propanediol bis (4-aminobenzoate) were added, evenly dissolved and an organic coating agent solution (IV) was obtained.

B. Method of granulating the basic ingredients

EXAMPLE 5

2,000 gr of 4,4'-diaminodiphenyl methane in flake form was heated and melted and titrated over a short period of time into a water tank measuring 30 cm in height, 70 cm in width and 40 cm in depth for granulation. Then, the granules settled on the bottom of the tank were taken out and dried for 15 hours in a vacuum drier adjusted at 60° C. and 10 mmHg. The dried substance was screened and granules within the range of 7 mesh to 5 mesh were separated. The volume thus separated was 700 gr, which was named to be granules ($\alpha$).

As the granules of 4,4'-methylene bis (2-chloroaniline) Cuamine-MT (tradename, prepared by Ihara Chemical) was provided, and after being made into granules as in the case of 4,4'-diaminodiphenyl methane, it was screened and granules within the range of mesh 7 to mesh 5 were separated. This is named to be granule ($\beta$).

C. Manufacture of surface-coated granular aromatic diamine

EXAMPLES 6-11

The prepared granules ($\alpha$) or ($\beta$) in the preset quantity was placed in a flow coater and was fluidized with air heated to 40° C. Furthermore, one of the organic coating agent solutions (I)–(IV) prepared in Examples 1 through 4 in the preset quantity was fed into the solution tank of the flow coater. Spraying was started at a spray air flow of 200 lit./minute and a flow of coating solution of 160 ml/min. The spraying was stopped in about 20 to 40 minutes and the granular aromatic diamine the surface of which was coated was taken out.

This was followed by checking of the coated conditions by scanning electron microscope.

The results of the foregoing procedures were compiled in Table 1.

Further, the surface coated granular aromatic diamine in this table was checked visually by melting it in a drier set at a temperature of the melting point of the basic ingredients plus 15° C., for checking for the presence or otherwise of unmelted portion and changes in the color of the molten diamine.

Since these surface coated granular aromatic diamines are generally utilized molten, the presence of unmelted portion of the coating material can markedly lower the performance of the polymer to be synthesized.

The surface coated granular aromatic diamines thus obtained were, therefore, melted for checking for unmolten portions, to find no presence of unmolten material in any of the Examples. It is thus understandable that the organic coating agent is thoroughly molten in the molten basic ingredients. In the test runs for checking for changes in the color with the passage of melting time, in the case of presence of the basic ingredients alone, with the lapse of melting time, the color largely changed from yellow to wine red, whereas in the case of the coating material containing epoxy resin (Examples 6, 7, 10, 11), they were found to undergo no changes thus playing the role of markedly improving the heat stability of the basic ingredients during the melting process.

D. The synthesis of polymer resins by use of surface coated granular aromatic diamine Examples 12 through 14. The synthesis of polyurethane elastomer 100 gr of urethane prepolymer (Ajiprene L-100, DuPont tradename, containing 4.2 weight% of isocyanate groups) was heated to 100° C., defoamed under reduced pressure of 20 mmHg, to which 12.5 gr ($NCO/NH_2$ mol ratio 1.05) of the molten portion of the surface coated granular aromatic diamines A, B or D (granule $\beta$ that has been coated) obtained under Examples 6, 7, 9 was added, mixed well, poured into a mold preheated to 100° C., hardened for 30 minutes, and further hardened for 15 hours in an oven to which 100° C. air was fed forcedly. The properties of the polyurethane elastomer thus obtained as well as its chemical composition are given in Attached Table—2.

In comparative Example 3, the synthesis was conducted using no more than 4,4'-methylene bis (2-chloroaniline) out of the basic ingredients and in the manner exactly same as the above-mentioned one.

Examples 14 and 15. The synthesis of epoxy resin

Epoxy resin (Epikote 828, tradename of Yuka Shell Epoxy Co., Ltd.) was heated to 120° C., 26.4 gr of the melted surface coating granular aromatic diamine E or F (granules $\alpha$ that have been coated) obtained under Example 10 or 11 was added, mixed well, poured into a mold preheated to 120° C. for curing for 4 hours, and further hardened at 200° C. for another 4 hours. The physical properties of the epoxy resin thus obtained as well as its physical composition are given in Attached Table —2.

In Comparative Example 4, the synthesis was conducted using no more than 4,4'-diaminodiphenyl methane out of the basic ingredients in the manner being totally identical with the above-mentioned one.

The mechanical properties of the polymer which was synthesized under the results given in Attached Table—2, using the surface coated granular aromatic diamine prepared under this invention as the raw material, were exactly the same as those recorded in the case of its basic ingredients alone, thus clearly indicating that no adverse effects are caused to the mechanical properties of the polymer.

TABLE 1

| Item | Comparative Example 1 | Example 6 | Example 7 | Example 8 | Example 9 | Example 10 | Example 11 | Comparative Example 2 |
|---|---|---|---|---|---|---|---|---|
| Surface coated granular aromatic diamine | | A | B | C | D | E | F | |
| Granules | | | | | | | | |
| Type | β | β | β | β | β | α | α | α |
| Consumption (Kg) | | 5 | 5 | 5 | 5 | 5 | 5 | |
| Organic coating Type | | III | IV | I | II | III | IV | |
| agent solution Consumption (Kg) | | 6.250 | 6.250 | 6.250 | 6.250 | 6.250 | 6.250 | |
| Volume of coating material (weight %)[1] | | 4 | 4 | 4 | 4 | 4 | 4 | |
| Electron microscope | | | | | | | | |
| Observed conditions | Blank | Good | Good | Good | Good | Good | Good | Blank |
| Observed film thickness (micron) | | 30 | 30 | 30 | 30 | 30 | 30 | |
| Presence or otherwise or unmelted portion in molten surface coated granular aromatic diamine | None | None | None | None | None | None | None | |
| Change in color of molten surface coated granular aromatic diamine | | | | | | | | |
| Lapse of time (in hours) | 0 4 | 0 4 | 0 4 | 0 4 | 0 4 | 0 4 | 0 4 | 0 4 |
| Color[2] | Y R | Y Y | Y Y | Y R | Y R | O O | O O | O R |

[1]The weight % was calculated as follows:

$$\frac{[(\text{Weight of coated basic ingredients}) - (\text{Weight of basic ingredients})] \times 10^2}{(\text{Weight of basic ingredients})}$$

[2]The designations of colors are as follows: Y: yellow, O: orange, R: wine red

TABLE 2

| Item | Example 12 | Example 13 | Example 14 | Comparative Example 3 | Example 15 | Example 16 | Comparative Example 4 |
|---|---|---|---|---|---|---|---|
| Chemical composition [Part] | | | | | | | |
| Weight of urethane prepolymer[1] | ←100→ | | | | | | |
| Weight of epoxy[2] | | | | | ←100→ | | |
| Surface coated granules | | | | | | | |
| Aromatic diamine: Type | A | B | D | β | E | F | α |
| Weight | ←12.5→ | | | | ←26.4→ | | |
| Hardening conditions | | | | | | | |
| Temperature (°C.) × time (hours) | ←100 × 16→ | | | | ←120 × 4 + 200 × 4→ | | |
| Physical properties | | | | | | | |
| Hardness (Shore A) | 92 | 92 | 92 | 92 | — | — | — |
| Tensile strength (Kg/cm²) | 330 | 335 | 351 | 321 | — | — | — |
| Flexural strength (Kg/cm²) | — | — | — | — | 1000 | 1000 | 1000 |
| Modulus (Kg/cm²) | — | — | — | — | 23700 | 23900 | 23600 |
| Tear strength (Kg/cm) | 81 | 92 | 83 | 84 | — | — | — |
| Elongation (%) | 420 | 445 | 453 | 460 | 5.3 | 5.4 | 5.4 |
| Heat deformation temperature[3] (°C.) | — | — | — | — | 168 | 168 | 168 |

[1]Ajiprene L-100 4.2 weight % (DuPont)
[2]Epikote 828 Epoxy equivalent 182-194 (Yuka Shell Epoxy Co.)
[3]Measured by ASTM D-648-56.

what we claim is:

1. A coated article of manufacture comprising a toxic aromatic diamine in granule form and having on the surface thereof a coating composition consisting essentially of at least one non-toxic diamine, at least one non-toxic glycol and a synthetic resin selected from the group consisting of urethane, epoxy, polyester, chloroprene, chlorinated rubber, vinyl chloride, nitrile rubber, cyanoacrylate, urea, and polyvinyl alcohol.

2. The coated article of claim 1 wherein the volume of the coating composition exceeds that of the toxic aromatic diamine by not more than 25%.

3. The coated article of claim 2 wherein the volume of the coating composition exceeds that of the toxic aromatic diamine by not more than 10%.

4. The coated article of claim 1 wherein the non-toxic diamine is selected from the group consisting of diaminodiphenyl sulfone, 1,3-propanediol bis (4-diaminobenzoate), 1,2-bis (2-aminophenyl thio) ethane, 4,4'-methylene bis (methyl anthranilate), 4-chloro-3,5-diamino benzoic acid isobutyl, 4,4'-methylene bis-(2,6-methyl aniline), 4,4'-methylene bis (2,6-diethyl aniline), 4,4'-methylene bis (2-methyl-6-isopropyl aniline), 4,4'-methylene bis (2,6-di-isopropyl aniline), 4,4'-methylene bis (2,3-dichloroaniline), 4,4'-methylene bis (2,5-dichloro aniline), 4,4'-methylene bis (2-methyl-6-chloro aniline), 4,4'-methylene bis (2-ethyl-6-chloro aniline) and 2,3,5,6-tetramethyl-1,4-phenylene diamine.

5. The coated article of claim 1 wherein the non-toxic glycol is selected from the group consisting of hydroquinone-bis (2-hydroxy ethyl) ether and N,N'-dihydroxy ethyl aniline.

6. The coated article of claim 1 wherein the toxic diamine is selected from the group consisting of 4,4'-methylene bis (2-chloroaniline), 4,4'-diaminodiphenyl methane, 4,4'-diaminodiphenyl ether, p-phenylene diamine, m-phenylene diamine, 4,4'-methylene bis (2-ethyl aniline), diaminopseudocumene, and diaminomesitylene.

7. A process of making the coated article of claim 1 comprising dissolving the coating composition in an organic solvent and spraying the so-obtained solution onto the toxic diamine granules.

8. The process of claim 7 wherein the organic solvent is selected from the group consisting of ethanol, isopropyl alcohol, ethylene dichloride, dichloromethane, tetrahydrofuran, 2-methoxy ethanol, 2-ethoxy ethanol, acetone, ethyl acetate, methylethyl ketone, toluene and xylene.

* * * * *